United States Patent [19]

Harrell et al.

[11] Patent Number: 4,837,082
[45] Date of Patent: Jun. 6, 1989

[54] FLEXIBLE MAGNETIC RECORDING MEDIA AND A METHOD USING A STABLE FLUID REACTIVE DISPERSION TO PREPARE MAGNETIC RECORDING MEDIA

[75] Inventors: Edward R. Harrell, White Bear Lake; Norman E. Rustad, Shoreview; Deral T. Mosbey, Cottage Grove, all of Minn.

[73] Assignee: Minnesota Mining and Manufacturing Company, St. Paul, Minn.

[21] Appl. No.: 892,229

[22] Filed: Jul. 31, 1986

[51] Int. Cl.$^4$ .................................................. G11B 5/74
[52] U.S. Cl. .................................. 428/329; 428/425.9; 428/694; 428/900
[58] Field of Search ............... 428/694, 522, 329, 900, 428/425.9

[56] References Cited

U.S. PATENT DOCUMENTS

| | | | |
|---|---|---|---|
| 4,004,997 | 1/1977 | Tsukamoto | 428/425.9 |
| 4,070,522 | 1/1978 | Ogasa | 428/900 |
| 4,368,238 | 1/1983 | Somezawa et al. | 428/413 |
| 4,400,498 | 8/1983 | Konishi et al. | 428/60 |
| 4,405,684 | 9/1983 | Blumentritt et al. | 428/336 |
| 4,407,901 | 10/1983 | Miyatsuka et al. | 428/694 |
| 4,647,506 | 3/1987 | Colon | 428/900 |

Primary Examiner—Paul J. Thibodeau
Attorney, Agent, or Firm—Donald M. Sell; Walter N. Kirn; Douglas B. Little

[57] ABSTRACT

Flexible magnetic recording media and stable-fluid, reactive dispersions of polymeric binder materials and particulate solids (either magnetic or non-magnetic) useful in preparing flexible or rigid magnetic recording media are provided. The use of a crosslinkable dispersing polymer comprised of a vinyl aromatic monomer and an ethylenically unsaturated monomer having hydroxyl functionality allows for magnetic media having both an excellent dispersion of finely divided magnetic particles, which improves the magnetic properties of the media, and an excellent set of mechanical characteristics, such as flexural modulus and tensile strength, of the magnetic media. The dispersing copolymer is used in an amount of at least about 5% by weight of the crosslinked binder mixture of which the crosslinkable dispersing polymer is a part.

29 Claims, No Drawings

FLEXIBLE MAGNETIC RECORDING MEDIA AND A METHOD USING A STABLE FLUID REACTIVE DISPERSION TO PREPARE MAGNETIC RECORDING MEDIA

FIELD OF THE INVENTION

This invention relates to a magnetic recording medium. In one aspect, this invention relates to a flexible magnetic recording medium comprised of a finely divided particulate solid dispersed in a particular binder. In another aspect, this invention relates to the use of a stable-fluid, reactive disperson of a finely divided particulate solid in preparing magnetic recording media.

BACKGROUND OF THE INVENTION

The properties required of the binder for a magnetic recording medium require precise synthesis of the binder materials. First and foremost of the properties required is the ability of the binder to maintain the extremely small magnetic particles in a fixed position which permits them to be magnetized, demagnetized and to impart a strong, modulated magnetic signal over long exposure to environmental and mechanical stresses. This ability requires physical properties of the binder, such as tensile strength, flexibility with high modulus and surface energy properties which promote dispersion and wettability, which to some extent, are mutually exclusive. In order to achieve overall balanced performance, compromises are made which permit acceptable limits of performance while optimizing specific properties such as modulus or wettability. In magnetic "tape" construction, properties such as flexibility are optimized. In magnetic "rigid disk" construction, hardness and durability can more easily be optimized because less emphasis is put on flexibility.

As magnetic media have become more sophisticated and as the magnetic particles which the binder is required to hold in rigid and intimate contact become extremely small with geometrical designs which enhance magnetic strength, the role of the binder becomes even more critical.

Binder formulation is further complicated by the fact that in order to make the storage of magnetic tape less bulky, the substrate, which is usually a highly oriented polyester film, has been made thinner and thinner in each succeeding generation of tape products. As a result, the polymeric binder, whose prime function is to maintain the magnetic particle in fixed position, is required to assume part of the function of the substrate, i.e., contribute to the mechanical properties of the magnetic media such as flexural modulus and tensile strength. This is so because with thicker substrates, the modulus and the tensile strength of the composite were provided by the substrate. In modern tapes with thinner substrates, the binder will substantially contribute to these properties of the composite.

However, to improve the magnetic properties of the magnetic recording medium, the goal of those in the art has been to minimize the amount of non-magnetic material, i.e., binder, used to bind the magnetic particles to the substrate. Accordingly, it is desired that less binder material be used, but that this lesser amount provide equivalent or better dispersion and binding of the magnetic particles as provided by higher levels of binder.

U.S. Pat. No. 4,405,684 to Blumentritt et al. discloses a rigid magnetic recording medium having finely divided magnetic particles dispersed in a thermosetting resin binder which is comprised of a blocked isocyanate having at least three reactive sites per chain and an oligomer having at least two hydroxy reactive sites per polymer chain and a molecular weight of 200 to 800 per hydroxy site. The patent discloses the incorporation of a functionality rigid polymer segment such as a styrene-allyl alcohol copolymer to improve the hardness of binders which are also comprised of hydroxyl-terminated polyesters. The object of the invention taught in the patent is to provide long pot life resin binder systems capable of achieving strong adhesion to a rigid substrate (such as an aluminum disc) used in the recording medium and to that end, blocked isocyanates are disclosed as crosslinking agents for the binder. The binder resin systems taught cannot be used in conventional flexible media due to thermal distortion and/or degradation of the flexible support base upon exposure to the temperatures needed to activate a blocked isocyanate.

U.S. Pat. No. 4,407,901 to Miyatsuka et al. discloses a magnetic recording medium comprising a non-magnetic base bearing a magnetic layer mainly consisting of ferromagnetic particles and a binder wherein the magnetic layer contains a minor amount of a copolymer having a polar functional group and a degree of polymerization of not more than 100. The copolymer is preferably precoated on the ferromagnetic particles by solvent deposition. Examples of polar functional groups are carboxyl groups, hydroxyl groups, phenolic-OH groups, and sulfonic acid groups. The carboxyl groups and phenolic-OH groups of the polymers disclosed in the only specific examples react with polyisocyanate crosslinking agents at ambient conditions only at undesireably slow rates.

SUMMARY OF THE INVENTION

This invention relates to a magnetic recording medium comprising:
(a) a flexible, non-magnetizable support base having two opposing major surfaces, and
(b) a layer on at least a portion of at least one of said major surfaces, which layer is either a magnetizable layer on said first major surface or a non-magnetizable layer, provided that when a non-magnetizable layer is present on one of said opposing major surfaces a magnetizable layer is present on said other opposing major surface, and further provided that either of said magnetizable and non-magnetizable layers is comprised of a finely divided particulate solid and a crosslinked binder mixture therefor, which crosslinked binder mixture is comprised of at least 5 weight percent of a dispersing polymer comprised of units derived from:
(i) one or more vinyl aromatic monomers, and
(ii) one or more ethylenically unsaturated monomers having aliphatic hydroxyl functionality,
which polymer assists in dispersing said particulate solid in said layer and which is crosslinked into said binder.

This invention also relates to a method of preparing magnetic media comprising forming a stable-fluid, reactive dispersion comprising a finely divided particulate solid and a crosslinkable dispersing polymer, mixing said dispersion with a crosslinker and coating at least a portion of a major surface of a non-magnetizable support base with said mixture. The reactive dispersion is a stable fluid before mixing with the crosslinker which allows the dispersing polymer to associate with, and thereby aid in the dispersion of, the finely divided particulate solid. The use of the crosslinkable dispersing polymer in preparing the magnetic media of this invention provides a magnetic layer and/or backside layer wherein the magnetic or other particles and the crosslinkable dispersing polymer associated therewith are uniformly and securely dispersed within a binder matrix thereby improving the resistance to movement of the particles and dispersing copolymer within the binder matrix. The reactive dispersion can be used to make the flexible magnetic recording media of this invention or rigid magnetic recording media.

The polymeric binder which contains the particulate solid is critical to this invention and is preferably comprised of a combination of the dispersing polymer described above, which contributes a "hard" component to the binder, and other crosslinkable resins, which contribute a "soft" component. Such other crosslinkable resins preferably include multi-hydroxyl functional polyurethanes as described below.

As used herein, a "crosslinked binder mixture" shall mean the mixture of crosslinkable binder resins, including both hard-component and soft-component, and the crosslinker therefore. When calculating the weight percent of a component of the crosslinked binder mixture, the weight of the finely divided particulate solid, suspending aids, lubricant, and the like are not included as part of the weight of the crosslinked binder mixture.

The finely divided particulate solid can be a finely divided magnetic material or other functional particles such as titanium dioxide and/or an electrically-conductive form of carbon. In a particularly preferred embodiment, the flexible nonmagnetic support base is a tape, the tape carrying on one surface a magnetizable layer having magnetic particles in the binder described above and carrying on the opposing surface a non-magnetizable layer having titanium dioxide and electrically-conductive carbon particles in the binder described above. For floppy disk applications, a magnetic layer of this invention may be present on both the major surfaces thereof, i.e., as a double-coated floppy disk.

DETAILED DESCRIPTION OF THE INVENTION

The present invention makes possible flexible recording media, e.g., magnetic tapes and floppy disks as well as rigid disks. In other words, the stable-fluid, reactive dispersions of this invention can be used to manufacture either flexible or rigid magnetic media, depending upon the nature of the non-magnetic base and the other components of the binder.

The stable-fluid, reactive dispersions of this invention are prepared by mixing the crosslinkable dispersing polymer with a composition comprised of the finely divided particulate solid. The mixture also contains one or more solvents to fluidize the mixture for ease of mixing along with wetting agents and suspending aids and other crosslinkable binder resins. The mixture is subjected to only moderate mixing forces, e.g., a Shar mixer at 4200 rpm for 2 to 4 hours, to obtain a homogeneous mixture, and then milled to prepare a smooth stable-fluid reactive dispersion of this invention. Suitable solvents include ketones, e.g., methyl ethyl ketone, and/or cyclohexanone, and aromatic hydrocarbons, e.g., toluene. Suitable wetting agents include phosphoric acid esters such as mono-phosphorylated propylene oxide adducts of glycerine, e.g., the reaction product of 1 mole of phosphorus oxychloride with the reaction product of 10-11 moles of propylene oxide and 1 mole of glycerine. Suitable suspending aids include quaternary ammonium acetates or phosphates such as Emcol TM acetate or phosphate available from Witco Chemical Co.

The flexible magnetic recording medium of this invention is comprised of a finely divided particulate solid dispersed in a binder on a flexible support base. The binder is preferably flexible as well. The elongation of the crosslinked binder mixture itself without the finely divided magnetic particles dispersed therein and without the wetting agents, suspending aids and other functional additives (i.e., unfilled) has been found to correlate well with the flexibility of the cured binder having the finely divided magnetic particles dispersed therein. Accordingly, the preferred crosslinked binder mixtures of the present invention have an elongation of at least about 5%, preferably at least about 10%, as measured by ASTM D-412-80 and D-638-82 so that the magnetic recording medium will be flexible, rather than rigid. For certain uses, the elongation of the crosslinked binder mixture is even greater, i.e. at least about 25% and preferably greater than 100%.

When used in the binder at proper concentrations in conjunction with the appropriate soft resin binders discussed below, a crosslinkable dispersing polymer of one or more vinyl aromatic monomers and one or more ethylenically unsaturated monomers having aliphatic hydroxyl functionality will yield a flexible, but hard magnetic medium which has low stiction, high modulus and an ultra-smooth surface. Further, dispersibility of the finely divided particulate solid in dispersions containing the polymer described above is such that higher solids coatings can be obtained with shorter mill cycles as compared with conventional hard resin binders, i.e. vinyl resins, nitrocellulose and phenoxy resins.

Examples of suitable vinyl aromatic monomers from which the crosslinkable dispersing polymers may be derived include styrene, vinyl toluene, alpha-methylstyrene, vinyl xylene and the like. Examples of suitable comonomers having aliphatic hydroxyl functionality include allyl alcohol, vinyl alcohol, 3-hydroxy-1-butene, 4-hydroxy-1butene, 2-hydroxyethyl acrylate, 2-hydroxypropyl acrylate, vinyl glycolate, and the like.

Quite adequate properties are obtained when the degree of polymerization of the dispersing polymer is about 100 or less. Similarly adequate properties are obtained when the degree of polymerization of the polymer and the amount of the hydroxyl functional comonomer is controlled so that the molecular weight of the polymer ranges from about 1,000 to about 2500 and the polymer has from about 0.2 to about 6 percent by weight hydroxyl groups.

The precise amount of crosslinkable dispersing polymer as a percentage of the binder resins may vary, but significant, i.e., greater than nominal amounts, allow the realization of benefits in terms of both the quality of the dispersion of the finely divided particulate solid and the mechanical properties of the binder. Accordingly, the dispersing polymer should be present in an amount not less than about 5 percent by weight of the crosslinked binder mixture, preferably from about 10 percent to about 30 percent by weight of the binder resins.

Because the dispersing polymer described above is crosslinked in the cured binder, the crosslinked binder mixture is also comprised of a polyfunctional organic compound having functional groups capable of reacting with the aliphatic hydroxyl groups of said dispersing polymer to crosslink the dispersing copolymer, hereinafter referred to as a crosslinker. Examples of suitable crosslinkers include polyisocyanates, polyaziridines, and the like. Preferred crosslinkers are polyisocyanates which will react with the aliphatic hydroxyl groups of the polymer and other binder resins to form urethane crosslinks in the cured binder. The preferred crosslinkers will have a crosslinking functionality between about 2 and about 4. A particularly preferred crosslinker is a triisocyanate produced by the reaction of 3 moles of toluene diisocyanate with 1 mole of trimethylolpropane available from Mobay Chemical as CB-60 or 75.

The dispersing polymer described above is a hard-component contributor in a polymeric binder formulation, i.e., a binder prepared from such a polymer alone would be hard, but may be too brittle for many applications, e.g., magnetic tape. Accordingly, it is preferred to use an additional cobinder polymer or resin, preferably hydroxy-functional, to contribute a soft component to the polymeric binder matrix and thereby toughen the binder. Examples of suitable cobinder resins include multi-hydroxy-functional polyurethanes as described in U.S. Pat. Nos. 4,368,238 and 4,400,498, incorporated herein by reference.

These resins are obtainable by the polymerization of a long chain diol (A) having a molecular weight ranging from about 500 to 3,000, an organic diisocyanate (C) and a short chain triol (D) having a molecular weight lower than about 500 and, if desired, a short chain diol (B) having a molecular weight ranging from about 50 to 500.

More particularly, preferred resins of this type comprise a combination of units represented by formulas (I):

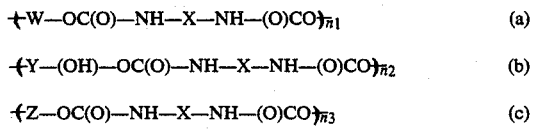

wherein

W is a residue derived by the elimination of the two hydroxyl groups from a long chain diol (A) having a molecular weight in a range of about 500 to 3,000;

X is a residue derived by the elimination of the two isocyanate groups from an organic isocyanate (C);

Y is a residue derived by the elimination of the two hydroxyl groups from a short chain triol (D) having a molecular weight in the range lower than about 500;

Z is a residue derived by the elimination of the two hydroxyl groups from a short chain diol (B) having a molecular weight in a range of about 50 to 500;

$n_1$ and $n_2$ are each a positive integer; and $n_3$ is 0 or a positive integer.

The long chain diol (A) to be employed for the thermoplastic polyurethane resin has a molecular weight in the range from about 500 to 3,000 and may include, for example, a polyester diol, a polyether diol, a polyether ester glycol and the like.

The polyester diol may include, for example, a polyester diol obtainable by the reaction of an aliphatic dicarboxylic acid such as succinic acid, adipic acid, sebacic acid, azelaic acid or the like; an aromatic dicarboxylic acid such as terephthalic acid, isophthalic acid or the like; a lower alcohol ester, such as methyl or ethyl ester, of the carboxylic acid with a glycol such as ethylene glycol, 1,3-propylene glycol, 1,4-butylene glycol, 1,6-hexane glycol, diethylene glycol, 1,4-cyclohexanedimethanol, neopentyl glycol or the like, an ethylene oxide adduct of bisphenol A or the like or a mixture thereof with a polyester diol of the lactone type obtained by the cleavage polymerization of a lactone such as ε-caprolactone or the like. The polyether diol may include, for example, a polyalkylene ether glycol such as polyethylene glycol, polypropylene ether glycol, polytetramethylene ether glycol or the like, and a polyether glycol obtainable by the copolymerization of these glycols. The polyether ester glycol may include, for example, a polyester ether glycol obtainable by the reaction of the aforesaid polyalkylene ether glycol with an aliphatic or aromatic dicarboxylic acid as hereinabove enumerated as the polyol component.

In magnetic tape applications, the multi-hydroxyl-functional polyurethane resin used in preparing a coating for the backside is preferably prepared with a long chain diol having a molecular weight greater than about 500 and less than about 1000. It has been found that these lower molecular weight long chain diols yield backside binder coatings having properties superior to those wherein the long chain diol has a molecular weight of 1000 g/mole or greater.

The short chain diol (B) to be optionally used for the thermoplastic polyurethane resin has a molecular weight in the range from about 50 to 500 and may include, for example, an aliphatic glycol such as ethylene glycol, propylene glycol, 1,4-butylene glycol, 1,6-hexane glycol, 1,4-cyclohexanedimethanol, neopentyl glycol or the like or an aromatic diol such as ethylene oxide adduct or propylene oxide adduct of bisphenol A, ethylene oxide adduct of hydroquinone or the like. The short chain diol (B) may be used singly or in admixture with each other.

The organic diisocyanate (C) to be used for the thermoplastic polyurehtane resin may include, for example, an aliphatic diisocyanate, an aromatic diisocyanate or an alicyclic diisocyanate such as hexamethylene diisocyanate, isophorone diisocyanate, dicyclohexylmethane diisocyanate, methylcyclohexane diisocyanate, toluene diisocyanate, 4,4'-diphenylmethane diisocyanate, ditoluene diisocyanate, paraxylene diisocyanate, naphthalene diisocyanate, dianisidine diisocyanate, xylylene diisocyanate or the like. The diisocyanates (C) may be employed singly or in admixture with each other.

The short chain triol (D) to be used for the thermoplastic polyurethane resin generally has a molecular weight in the range lower than about 500. Specific examples include glycerine, propylene oxide adduct of glycerine, ethylene oxide adduct of glycerine, 2-methylpropane-1,2,3-triol, 4-[bis(2-hydroxyethyl)]-2-hydroxypentane, 3-methylpentane-1,3,5-triol, and 1,2,6-hexanetriol, 1-bis(2-hydroxyethyl)-amino-2-propanol (N-isopropanol diethanolamine), propylene oxide adduct of diethanolamine, and ethylene oxide adduct of N-isopropanoldiethanolamine.

The thermoplastic polyurethane resin may be prepared by subjecting the long chain diol (A), the short chain triol (D) and the organic diisocyanate (C), and optionally, the short chain diol (B) to a polymerization reaction. The polymerization may be carried out by a known method: for example, a one-shot method in which all the components are simultaneously reacted with each other in solution. It is also convenient to use a modified one-shot method in which all the (A), (B), (C) and (D) reactants are charged together with the exception of a portion of isocyanate (C) which is reserved. This reserved portion is then added to the reaction mixture after the originally charged isocyanate (C) is consumed.

The weight ratio of soft-component contributing cobinder resin to hard-component contributing resin will preferably range from about 4:1 to 1:4. To balance the rigidity contributed to the binder by the dispersing copolymer, other hard-component contributing resins such as vinyl resins and nitrocelluloses can be blended with the dispersing polymer at a ratio between 1:4 and 4:1 by weight to modify the hard-component as it is blended with the soft-component crosslinkable resins.

Suitable examples of vinyl resins which can be used in the present invention are vinyl chloride/vinyl acetate copolymers, vinyl chloride/vinylidene chloride copolymers, vinyl chloride/acrylonitrile copolymers, vinylidene chloride/acrylonitrile copolymers, and polyvinyl butyral. These polymers preferably contain functional groups which strengthen adsorption of the binder on magnetic materials. Preferred examples of such functional groups include a hydroxyl group and a carboxyl group. Particularly preferred examples include a vinyl chloride/vinyl alcohol copolymer, a vinyl chloride/maleic acid copolymer, a vinyl chloride/vinyl acetate/vinyl alcohol copolymer, a vinyl chloride/vinyl acetate/maleic acid copolymer, a vinyl chloride/vinyl alcohol/maleic acid copolymer, a vinyl chloride/vinyl acetate/vinyl alcohol/maleic acid copolymer.

The finely divided magnetic particles used in this invention may include the particles of magnetic oxides, such as, gamma-$Fe_2O_3$, $Fe_3O_4$, a mixture of gamma-$Fe_2O_3$ with $Fe_3O_4$, $CrO_2$, barium ferrite, or Berthollide compound and particles of ferromagnetic metals or ferromagnetic alloys such as Fe, Fe-Co, Co-Ni, Co-Cr, Fe-Co-Ni, Fe-Co-B, Fe-Co-Cr-B, Fe-Co-V, or iron nitride.

When the binder is to be used as a backside coating for a magnetic tape, a finely divided electrically-conductive form of carbon can be included to reduce the build-up of static electricity on the magnetic medium. Alternatively, or in addition to the electrically-conductive carbon, titanium dioxide or other inorganic fillers can be included in the backside.

Preparation of Recording Medium

The magnetic recording medium of this invention is preferably prepared by first preparing a stable-fluid, reactive dispersion of the finely divided particulate solid in a composition comprised of the dispersing polymer having hydroxyl functionality. The stable dispersions are preferably prepared by mixing the crude particulate solid into a mixture comprised of solvent, wetting agent, and suspending agent. At least a portion of the crosslinkable dispersing polymer is then added to form a wetted slurry. The wetted slurry is then milled until the average particle size of the crude magnetic particles is small enough such that the dispersion exhibits the desired smoothness. A soft-component contributing cobinder resin along with any remaining dispersing polymer and additional fluidizing solvents can be added either before or after milling. The milling process will yield a stable dispersion of finely divided magnetic particles dispersed in a fluidizing solvent, the dispersing polymer contributing to the quality of the dispersion. The use of the dispersing polymer allows for more efficient production, i.e., fewer milling cycles, of a coatable particle/binder composition having a quality of dispersion equivalent to that of particle/binder compositions without the dispersing resin, but made with a greater number of milling cycles. This stable dispersion is then mixed with the crosslinker to form a curable composition.

The curable composition can then be coated on a support base and allowed to cure. The coating is preferably surface-treated prior to, or after curing, by well-known techniques of calendering, polishing and/or burnishing.

A preferred flexible support base is comprised of a film of synthetic polymer having desired degrees of flexibility and tensile strength. An example of a preferred flexible support base is a polyethylene terephthalate tape backing having a thickness from about 8 micrometers to about 80 micrometers.

Because the preferred flexible support bases, e.g., polyethylene terephthalate tape, should not be exposed for prolonged periods to temperatures above about 100° C., the curable compositions prepared for use on flexible support bases should be curable to the desired degree at a temperature below about 100° C. Accordingly, when preparing flexible magnetic media, the crosslinker chosen as a component of the curable composition should be sufficiently reactive with the dispersing copolymer and other crosslinkable binder polymers so as to crosslink the system to the desired degree at temperatures below about 100° C., most preferably at ambient temperatures. In this respect, an isocyanate used as a crosslinker in preparing flexible magnetic media should be a free polyisocyanate, rather than blocked isocyanates which require temperatures above about 100° C. to cure the binder resin system. Blocked polyisocyanates are known in the art as compounds having multiple isocyanate groups which have been reacted with a blocking compound, e.g., a ketoxime, such that the blocking reaction is reversible at elevated temperatures.

The magnetic medium of this invention is useful for recording magnetic signals when used with a variety of magnetic signal generating devices, e.g., in video tapes, computer tapes and diskettes, and the like.

EXAMPLES

Starting Materials

Multi-Hydroxyl-Functional Urethanes (MHFU)

The multi-hydroxyl-functional urethanes used as soft-component contributing cobinder resins in the examples below are described below.

Multi-Hydroxyl-Functional Urethane-I (MHFU-I)

This multi-hydroxy polyurethane was prepared by carrying out a reaction in a 22-liter, three-neck reaction flask, heated by a variac-controlled heating mantle, fitted with thermometer, mechanical stirrer, and a condenser with means for introducing nitrogen to maintain an inert atmosphere within the reaction flask. An initial charge of 1,033 g of 4,4' methylene-bis-(cyclohexyl) diisocyanate (H-MDI), 191.7 g of 1,4-cyclohexanedimethanol, 1,902.7 g of polytetramethyleneoxide diol having a molecular weight of about 650 g/mol (available from duPont as TERACOL ™ 650), 110.2 g of glycerol, 5,244 g of methyl ethyl ketone and 1.7 g of dibutyltin dilaurate was introduced into the 22-liter reaction flask, which had been first flushed with nitrogen. The nitrogen atmosphere was maintained throughout the reaction. The mixture was heated at reflux until no isocyanate was detectable by infrared spectroscopic examination. This occurred after about an hour of refluxing. At this point an inherent viscosity determined in methyl ethyl ketone of about 0.15 had been reached. Additional chargings of the remaining 259 g of H-MDI in increments were made followed by heating at reflux until the desired inherent viscosity of 0.23 was reached. A sample of multi-hydroxy functional polyurethane (MHFU-I) exhibited a glass transition temperature (Tg) of $-32°$ C., a weight average molecular weight of 43,652, a number average molecular weight of 12,366 and a hydroxyl equivalent weight of 1,601.

Multi-Hydroxyl-Functional Urethane-II (MHFU-II)

The preparation of this multi-hydroxy-functional urethane was carried out in a 22-liter, three-neck reaction flask heated by a variac-controlled heating mantle and fitted with a thermometer, mechanical stirrer, and a condenser with a means for introducing and maintaining an inert nitrogen atmosphere above the reactant mixture. A charge of 673.6 g of isophorone diisocyanate, 1300 g of a polytetramethyleneoxide diol having a molecular weight of about 1000 g/mol (available from duPont as Teracol ™ 1000), 305.6 g of 1,4 cyclohexanedimethanol, 28.08 g of glycerol, 3,460 g of methyl ethyl ketone and 0.46 g of dibutyltin dilaurate was introduced into the 22-liter reaction flask which had been first flushed with nitrogen and the nitrogen atmosphere was maintained. The mixture was heated at reflux under nitrogen atmosphere until no isocyanate was detectable by infrared spectroscopic examination. This required about one hour of heating at reflux. At that point the inherent viscosity determined in methyl ethyl ketone was 0.15. An additional charge of 75.01 g of isophorone diisocyanate was made and heating at reflux was continued for one hour at which time no isocyanate was detectable by infrared spectroscopic examination. The inherent viscosity was now 0.21. Charging of isophorone diisocyanate increments was continued until an inherent viscosity of from 0.23 to 0.33 was achieved. A sample of the resulting polyurethane exhibited a glass transition temperature of $-32°$ C., a weight average molecular weight of 45,092 and a hydroxyl equivalent weight of 3680.

EXAMPLE 1

A representative flexible magnetic recording medium of this invention was prepared from a reactive dispersion of this invention as follows.

Reactive Dispersion

First, a slurry was prepared from the following components.

| Material | Amount by Wt in Grams | Solids | Function |
| --- | --- | --- | --- |
| Cobalt doped magnetic gamma iron oxide (30-35 m$^2$/gm) | 2152 | 2152 | Magnetic pigment |
| Solvent blend (70% methyl ethyl ketone, 20% cyclohexanone, 10% Toluene) | 1445 | — | Solvent |
| Phosphoric acid ester (75% solids in Toluene) | 107 | 80 | Wetting agent |
| Quaternary ammonium acetate (available as Emcol ™ Acetate from Witco Chemical Co.) | 40 | 40 | Suspending agent |

The above mixture was mixed in a water jacketed Shar mixer at 4200 rpm for about 3 hours. The resulting slurry was checked for smoothness by visual inspection for transmitted light under a 256 power microscope. A styrene/allyl alcohol copolymer available from Monsanto as RJ-100 was then added to the mixture in the form of 47 grams of the copolymer dissolved in 110 grams of methyl ethyl ketone (MEK). The styrene/allyl alcohol copolymer had a hydroxyl percent of 5.7%, an equivalent weight of 300, a number average molecular weight of 1600, and a weight average molecular weight of 2300. The resulting mixture was mixed at 4800 rpm for an additional ½ hour. The mixture was then transferred to an Eiger mill where it was milled until it was smooth, e.g. 7 to 10 passes at approximately one and a half hours per pass. An additional 22 grams of the styrene/allyl alcohol copolymer dissolved in 50 grams of MEK was then added to the mixture along with 160 grams of MHFU-I in 242 grams of MEK. The resulting mixture was milled for an additional 5 hours to yield a stable fluid reactive dispersion of this invention. This coatable binder has a 70/30 ratio by weight of "soft" resin binder (MHFU-I) to "hard" resin binder (styrene-/allyl alcohol copolymer).

Coatable Binder Composition

The following ingredients were added to the reactive dispersion prepared above.

| Material | Amount by Wt in Grams | Solids | Function |
| --- | --- | --- | --- |
| Butyl myristate | 32.3 | 32.3 | Lubricant |
| Myristic acid | 21.5 | 21.5 | Lubricant |
| Al$_2$O$_3$ dispersion | 143.5 | 86.1 | Head cleaning agent |
| Trifunctional isocyanate (available from Mobay as CB-60) | 367 | 220.2 | Crosslinker |

The resulting mixture was homogenized with a shear mixer to yield a coatable binder composition.

The coatable binder composition prepared above was coated at a thickness of 5 micrometers on a 14 micrometer thick poly(ethylene terephthalate) backing using a gravure roll coater. The resulting coated film was calendered.

Magnetic Recording Media Properties

The magnetic recording media manufactured above exhibited the following properties.

Flexural Modulus (measured by the procedure of ASTM-D-890 after 7 day cure at room temperature): $6.7 \times 10^6$ KPa % Polymer Cure 97.5% (2.5% extracted by THF after curing 7 days at 23° C. and 50% RH)

EXAMPLE 2

Another representative magnetic recording medium was prepared as in Example 1 with the following exceptions, changes and/or omissions. The reactive dispersion of Example 2 was the same as that of Example 1 except that the initial charge of 47 grams of styrene/allyl alcohol copolymer in 110 grams of MEK was reduced to 41 grams of styrene/allyl alcohol copolymer in 96 grams of MEK. Also, the secondary charge of styrene/allyl alcohol copolymer was increased from 22 grams in 50 grams MEK to 38 grams, styrene/allyl alcohol copolymer in 89 grams MEK. The charge of MHFU - I was reduced from 161 grams in 242 grams of MEK to 52 grams MHFU - I in 78 grams of MEK. This coatable binder has a 40/60 ratio by weight of soft binder resin (MHFU-I) to "hard" resin binder (styrene-/allyl alcohol copolymer).

The only change in the coatable binder composition was a reduction in the amount of trifunctional isocyanate crosslinker from 220.2 grams solids in 146.8 grams solvent to 190.8 grams solids in 127.2 grams solvent. The resulting magnetic properties of the resulting magnetic recording medium are shown below.

Flexural Modulus (7 day cure): $7.6 \times 10^6$ KPa
% Polymer Cure approximately 100% (negligible THF extractibles after curing 7 days at 23°/ 50% RH)

EXAMPLE 3

The procedure used in Example 3 was the same as that of Examples 1 and 2, except that a second hard binder resin, a vinyl chloride/vinyl alcohol/vinyl acetate copolymer available from Union Carbide as VAGH ™ was mixed with the additional charge of stryene/allyl alcohol copolymer. The coatable binder has a 45/55 ratio by weight of "soft" component resin (MHFU-II) to "hard" component resin (styrene/allyl alcohol copolymer and VAGH). The precise amounts of each ingredient are shown in the following table.

| Material | Amount by wt. (g) | Wt. of Solids | Function |
|---|---|---|---|
| Reactive Dispersion | | | |
| Cobalt doped gamma iron oxide | 100 | 100 | Magnetic Pigment |
| Methyl ethyl ketone | 45.1 | — | Solvent |
| Toluene | 9.2 | — | Solvent |
| Cyclohexanone | 17.5 | — | Solvent |
| Phosphoric acid ester | 8.0 | 6.0 | Wetting agent |
| Quaternary ammonium phosphate | 2.0 | 2.0 | Suspending/agent |
| RJ-100 (30% solids in MEK) | 10.3 | 3.10 | Binder resin |
| VAGH (31.6% in MEK) | 4.1 | 1.30 | Binder resin |
| MHFU-II | 9.0 | 3.64 | Binder resin |
| Coatable Binder Composition | | | |
| Butyl myristate | 0.5 | 0.5 | Lubricant |
| Myristic acid | 3.5 | 3.5 | Lubricant |
| Al$_2$O$_3$ dispersion | 8.0 | 4.0 | Head/cleaning agent |
| Tri-functional isocyanate (available from Mobay Chemical Co. as CB-60) | 15.6 | 9.36 | Crosslinker |

EXAMPLE 4

A backside coating used as an antistatic layer was prepared and coated by the procedures described above with the exceptions noted below. The binder is a blend of "hard" resin (70/30 RJ-100/VAGH) with "soft" resin (MHFU-I).

| Material | Amount by wt. in Grams | Solids | Function |
|---|---|---|---|
| Acetylene Carbon | 100 | 100 | Antistat |
| Methyl Ethyl Ketone | 163 | | Solvent |
| Toluene | 68 | | Solvent |
| Cyclohexanone | 30 | | Solvent |
| Phosphoric Acid Ester (described above) | 2.7 | 2 | Wetting Agent |
| Styrene-Allyl Alcohol[1] Resin in MEK | 59 | 17.7 | Binder Resin |
| Vinyl Chloride[2] Resin in MEK | 23 | 7.4 | Binder |
| MHFU-I | 61 | 25 | Binder Resin |
| Trifunctional Isocyanate[3] | 47.5 | 28.5 | Crosslinker |

[1]Available from Monsanto as RJ-100
[2]Available from Union Carbide as VAGH ™ Resin
[3]Available from Mobay as CB-60

EXAMPLE 5

A backside coating, pigmented and conductive due to presence of titanium dioxide and carbon. The binder is a blend of "hard" resin (70/30, RJ-100/VAGH) with "soft" resin (MHFU-I).

| Material | Amount by wt. in Grams | Solids | Function |
|---|---|---|---|
| Titanium Dioxide | 81 | 81 | Pigment |
| Ketjen Black (Carbon) | 19 | 19 | Antistat |
| Methyl Ethyl Ketone | 163 | | Solvent |
| Toluene | 68 | | Solvent |
| Cyclohexanone | 30 | | Solvent |
| Phosphoric Acid Ester | 2.7 | 2 | Wetting Agent |
| Styrene-Allyl Alcohol[1] Resin in MEK | 59 | 17.7 | Binder |
| Vinyl Chloride[2] Resin in MEK | 23 | 7.4 | Binder |
| MHFU-I | 61 | 25 | Binder |
| Trifunctional Isocyanate[3] | 47.5 | 28.5 | Crosslinker |

[1]Available from Monsanto as RJ-100
[2]Available from Union Carbide as VAGH ™ Resin
[3]Available from Mobay as CB-60

What is claimed is:

1. A magnetic recording medium having a magnetizable layer and selected from diskettes and tapes and comprising:
   (a) a flexible, non-magnetizable support base having two opposing major surfaces, and
   (b) a layer on at least one of said major surfaces, which layer is comprised of a finely divided particulate solid dispersed and fixed in a crosslinked binder mixture therefor, said finely divided particulate solid being selected from magnetic particles, carbon black, and inorganic fillers suitable for back side coatings on magnetic recording tape, and said crosslinked binder mixture containing:
   (1) at least 5 weight percent of a dispersing polymer having a degree of polymerization of not more than about 100 and comprised of units derived from:
      (i) one or more vinyl aromatic monomers, and
      (ii) one or more ethylenically unsaturated monomers having aliphatic hydroxyl functionality, which polymer is crosslinked into said crosslinked binder mixture; and
   a soft-component contributing cobinder resin which is a multi-hydroxy-functional polyurethane, the weight ratio of hard-component binder resins to soft-component binder resins ranging from about 1:4 to 4:1.

2. A magnetic recording medium in accordance with claim 1 wherein the crosslinked binder mixture is comprised of from about 10 to about 30 weight percent of said dispersing polymer.

3. A magnetic recording medium in accordance with claim 1 wherein the vinyl aromatic monomer is styrene.

4. A magnetic recording medium in accordance with claim 1 wherein the ethylenically unsaturated monomer having aliphatic hydroxyl functionally is allyl alcohol.

5. A magnetic recording medium in accordance with claim 1 wherein said dispersing polymer is derived from styrene and allyl alcohol.

6. A magnetic recording medium in accordance with claim 1 wherein the crosslinked binder mixture has an elongation of at least about 5%.

7. A magnetic recording medium in accordance with claim 1 wherein the crosslinked binder mixture has an elongation of at least about 25%.

8. A magnetic recording medium in accordance with claim 1 wherein the crosslinked binder mixture is crosslinked with a polyisocyanate crosslinker.

9. A magnetic recording medium in accordance with claim 1 wherein said multi-hydroxyl-functional polyurethane is the polymerization reaction product at a mixture comprised of a long chain diol having a molecular weight of from about 500 to about 3000, an organic diisocyanate, and a short chain triol having a molecular weight of less than about 500, wherein a portion of the organic diisocyanate to be reacted is initially reserved from the reaction mixture and is then added to the reaction mixture after the unreserved portion of said organic diisocyanate has reacted.

10. A magnetic recording medium in accordance with claim 1 wherein said crosslinked binder mixture is comprised of a further hard-component cobinder resin selected from the group of hard vinyl resins and nitrocellulose.

11. A magnetic recording medium in accordance with claim 1 wherein said dispersing polymer is present only in a magnetizable layer.

12. A magnetic recording tape in accordance with claim 1 wherein said finely divided particulate solid is comprised of an electrically conductive form of carbon.

13. A magnetic recording tape in accordance with claim 1, wherein said finely divided particulate solid is comprised of titanium dioxide.

14. A magnetic recording tape in accordance with claim 1, wherein said finely divided particulate solid is comprised of a mixture of titanium dioxide and an electrically conductive form of carbon.

15. A magnetic recording tape in accordance with claim 1 wherein said non-magnetizable layer is further comprised of a soft-component contributing cobinder resin which is a multi-hydroxy-functional polyurethane comprised of a long-chain diol having a molecular weight greater than about 500 and less than about 3000.

16. A magnetic recording tape in accordance with claim 1 wherein said non-magnetizable layer is further comprised of a soft-component contributing cobinder resin which is a multi-hydroxy-functional polyurethane comprised of a long-chain diol having a molecular weight greater than about 500 and less than about 1000.

17. A magnetic recording medium in accordance with claim 1 wherein said dispersing polymer is present in said magnetizable layer on one of said opposing major surfaces and in said non-magnetizable layer on the other opposing major surface.

18. A magnetic recording medium in accordance with claim 1 wherein said dispersing polymer is present in separate magnetizable layers on each of said opposing major surfaces.

19. A magnetic recording medium having a magnetizable layer and selected from diskettes and tapes and comprising:
(a) a flexible, non-magnetic support base having two opposing major surfaces, and
(b) a layer on at least one of said major surfaces, which is comprised of a finely divided particulate solid dispersed and fixed in a crosslinked binder mixture therefor, said finely divided particulate solid being selected from magnetic particles, carbon black, and inorganic fillers suitable for back side coatings on magnetic recording media, and said crosslinked binder mixture being comprised of a polyisocyanate crosslinker, a soft-component contributing multi-hydroxy-functional polyurethane, and at least 5 weight percent of a dispersing and hard-component contributing polymer having a degree of polymerization of not more than about 100 comprised of units derived from:
(i) styrene and
(ii) allyl alcohol, which polymer is crosslinked into said crosslinked binder; wherein the weight ratio of hard-component binder resin to soft-component binder resin ranges from about 1:4 to 4:1.

20. Improved method of preparing a flexible magnetic recording medium having a magnetizable layer, wherein the improvement comprises making at least one layer of the recording medium as follows:
(a) preparing a stable-fluid, reactive dispersion comprised of:
(i) a finely divided particulate solid,
(ii) binder resins, at least 5 percent of which comprise:
(1) a crosslinkable, hard component, dispersing polymer having a degree of polymerization of not more than 100 and comprised of units derived from:
(a) one or more vinyl aromatic monomers, and
(b) one or more ethylenically unsaturated monomers having aliphatic hydroxyl functionality, and which also comprise
(2) a multi-hydroxy-functional soft component polyurethane, there being a weight ratio of hard to soft resins in the binder of from 1:4 to 4:1
(b) mixing said dispersion with a crosslinker comprised of a polyfunctional organic compound having functional groups capable of reacting with the aliphatic hydroxyl groups of said dispersing polymer to form a crosslinkable binder mixture,
(c) coating at least a portion of the first or second opposing major surfaces of a flexible, polymeric, non-magnetic support base with said resulting mixture, and
(d) allowing said coating to cure at a temperature below about 100° C.

21. A method in accordance with claim 20 wherein said finely divided particulate solid is a magnetic material.

22. A method in accordance with claim 20 wherein said magnetic material is comprised of a magnetic iron oxide.

23. A method in accordance with claim 20 wherein said finely divided particulate solid is a conductive form of carbon.

24. A method in accordance with claim 20 wherein said finely divided particulate solid is titanium dioxide.

25. A method in accordance with claim 20 wherein said finely divided particulate solid is a mixture of titanium dioxide and a conductive form of carbon.

26. A method in accordance with claim 20 wherein said reactive dispersion further comprises a fluidizing solvent.

27. A method in accordance with claim 20 wherein said crosslinker is a free polyisocyanate.

28. A method in accordance with claim 20 wherein said coating is surface-treated to impart smoothness.

29. A magnetic recording tape having a magnetizable layer, said tape comprising:
   A. a flexible, non-magnetizable support base tape having two opposing major surfaces, and
   B. a non-magnetizable layer on one of said major surfaces, which layer is comprised of a finely divided particulate solid dispersed and fixed in a crosslinked binder mixture therefor, said finely divided particulate solid being selected from carbon black and inorganic fillers suitable for backside coatings on magnetic recording tape, and said crosslinked binder mixture containing at least 5 weight percent of a dispersing polymer having a degree of polymerization of not more than about 100 and comprised of units derived from:
   (i) one or more vinyl aromatic monomers, and
   (ii) one or more ethylenically unsaturated monomers having aliphatic hydroxyl functionality, which dispersing polymer is crosslinked into said crosslinked binder mixture.

* * * * *

UNITED STATES PATENT AND TRADEMARK OFFICE
CERTIFICATE OF CORRECTION

PATENT NO. : 4,837,082

DATED : June 6, 1989

INVENTOR(S) : Harrell, Rustad and Mosbey

It is certified that error appears in the above-identified patent and that said Letters Patent is hereby corrected as shown below:

In the specification:

Column 2, line 6, "a functionality" should be -- a high functionality --

Column 4, line 43, "4-hydroxy-1butene" should be -- 4-hydroxy-1-butene --

In the claims:

Column 13, line 5, "functionally" should be --functionality--

Claims 12 - 16 should depend from Claim 29

Signed and Sealed this

Twenty-fourth Day of April, 1990

Attest:

HARRY F. MANBECK, JR.

Attesting Officer

Commissioner of Patents and Trademarks